March 26, 1935.   G. C. JETT   1,995,854
TRAILER
Filed March 19, 1930   5 Sheets-Sheet 1
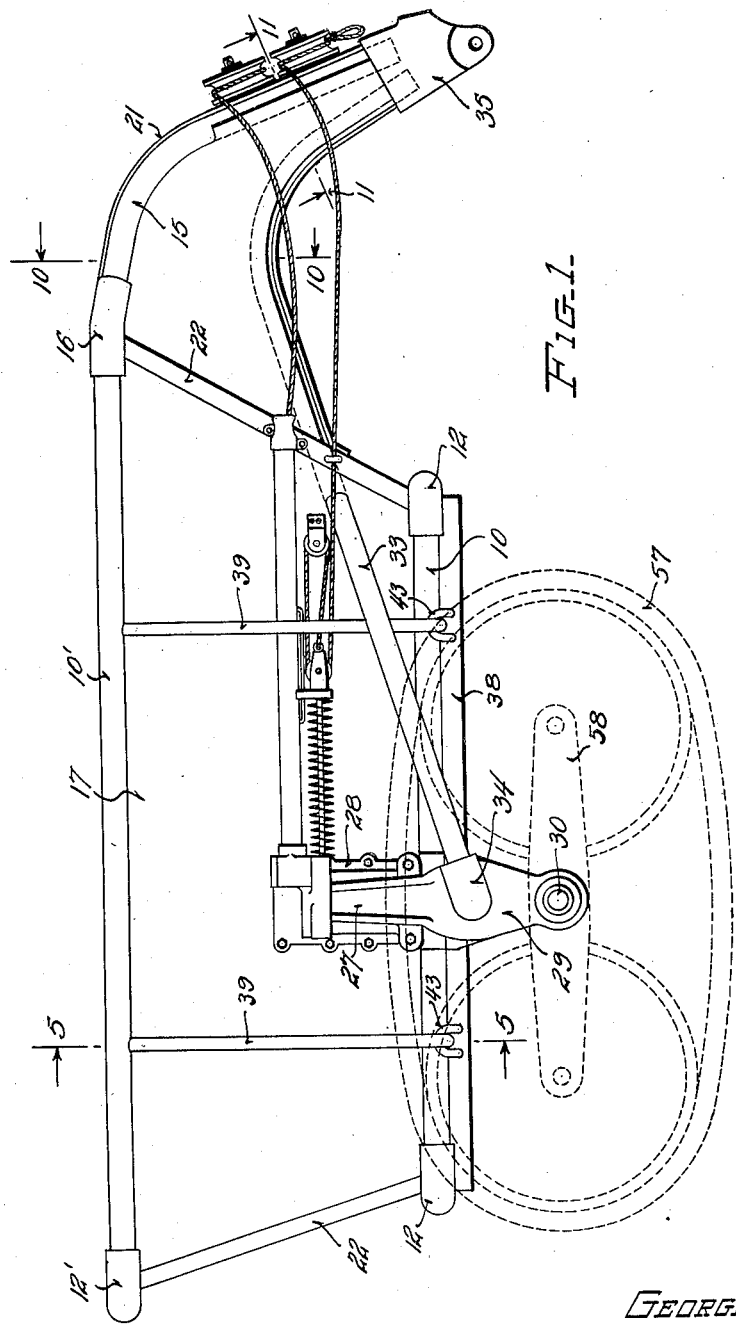
Inventor
GEORGE C. JETT
By Ralph W. Brown,
Attorney March 26, 1935.　　　　G. C. JETT　　　　1,995,854
TRAILER
Filed March 19, 1930　　5 Sheets-Sheet 2
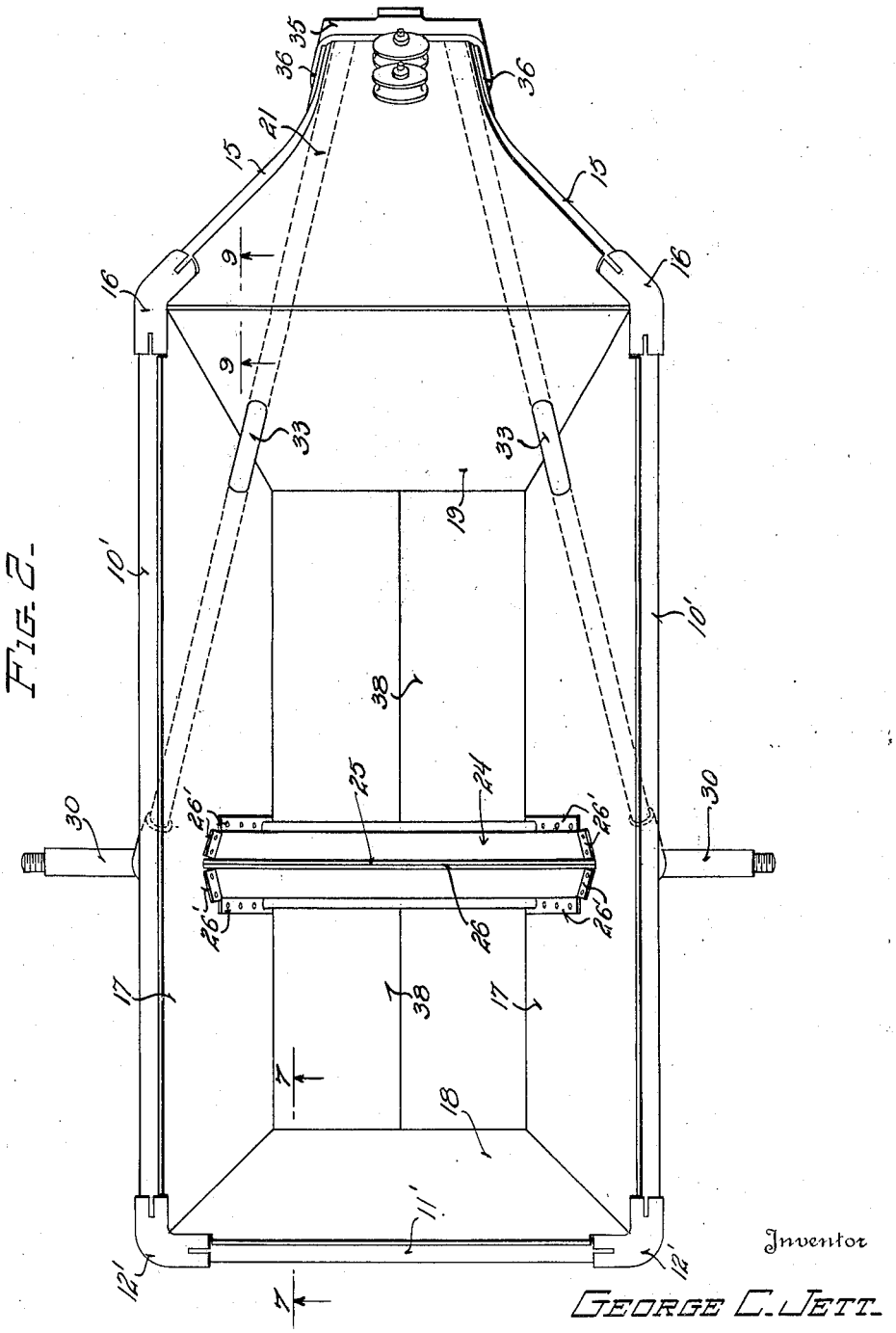

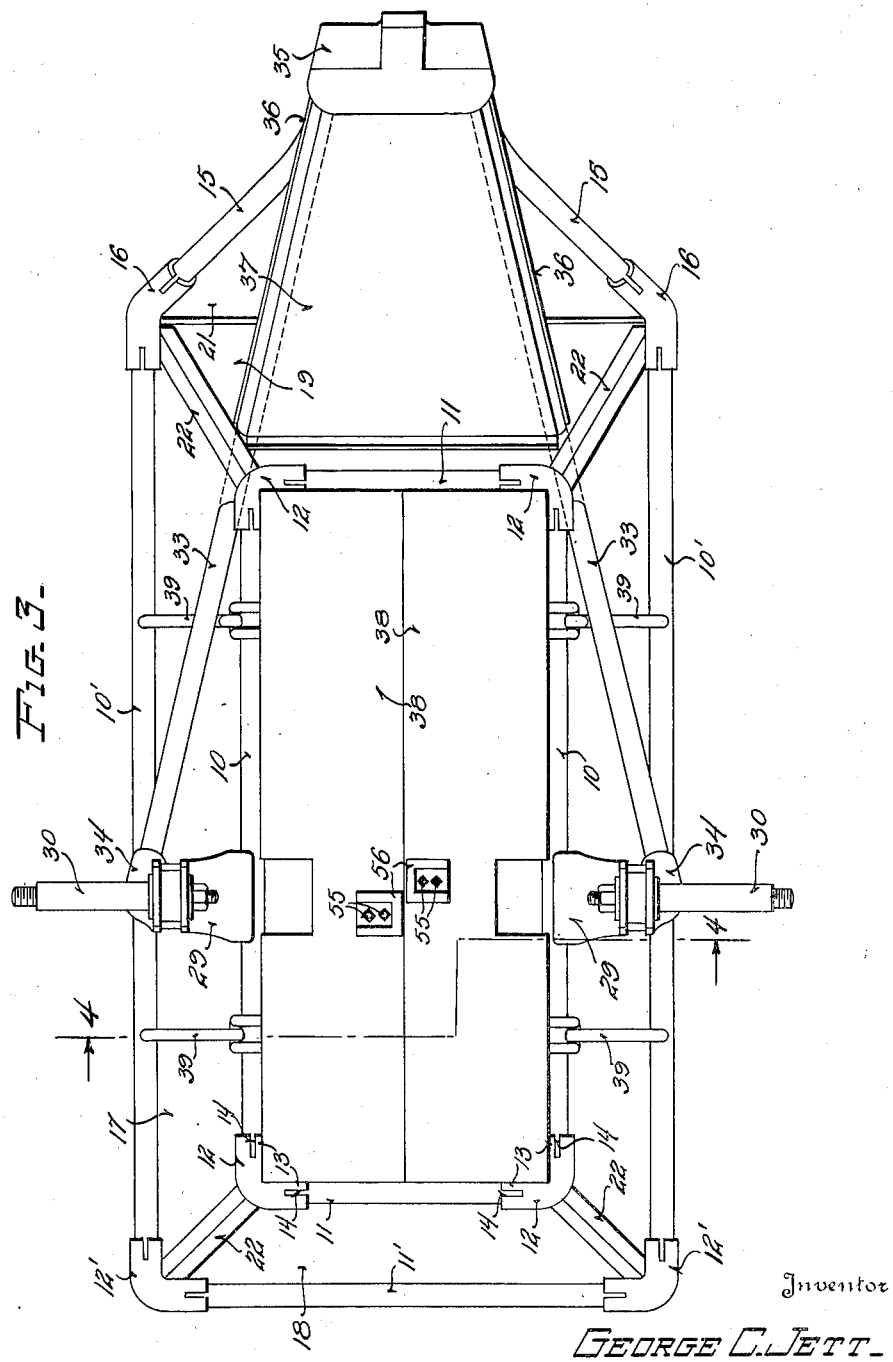

March 26, 1935.  G. C. JETT  1,995,854
TRAILER
Filed March 19, 1930    5 Sheets-Sheet 4
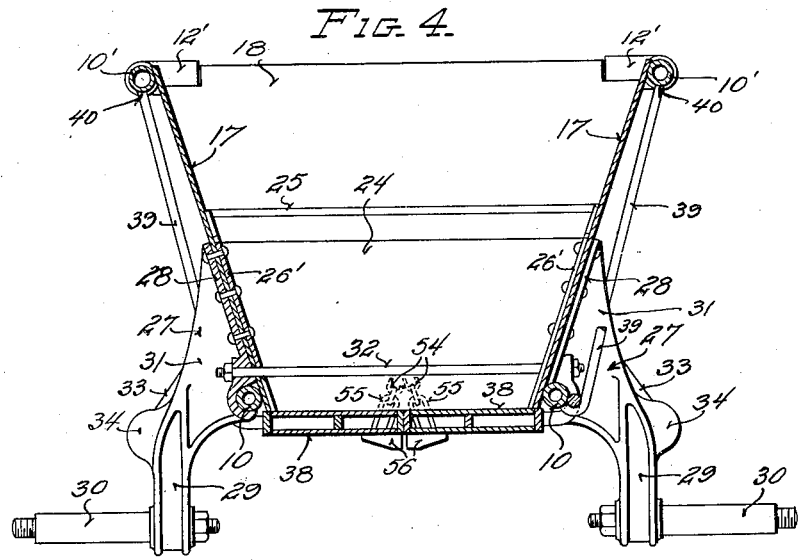
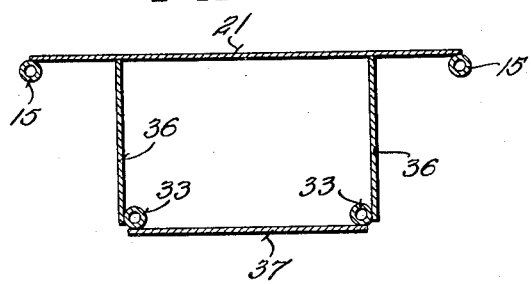
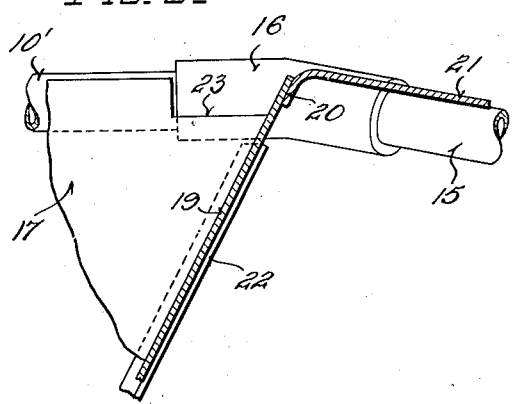
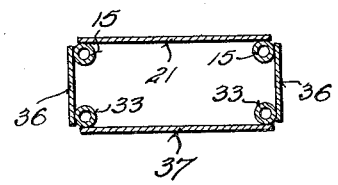
Inventor
GEORGE C. JETT
By Ralph W. Brown.
Attorney March 26, 1935.  G. C. JETT  1,995,854
TRAILER
Filed March 19, 1930  5 Sheets-Sheet 5
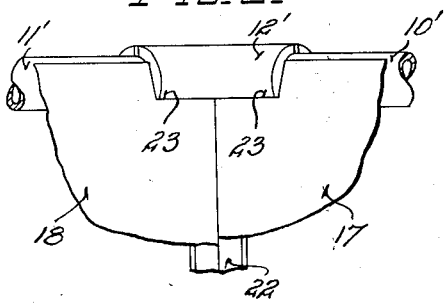
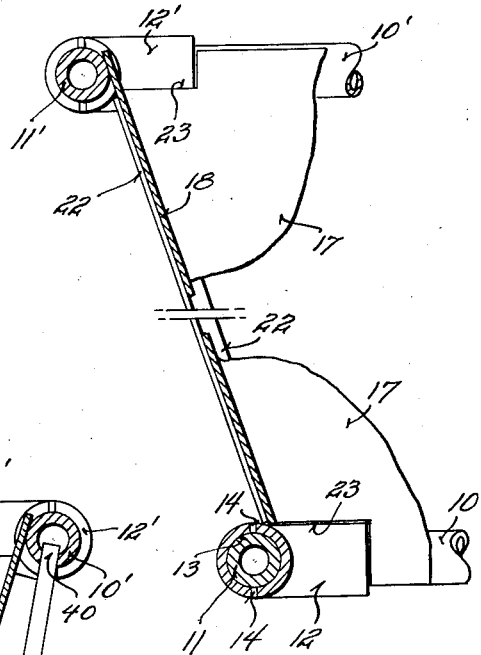
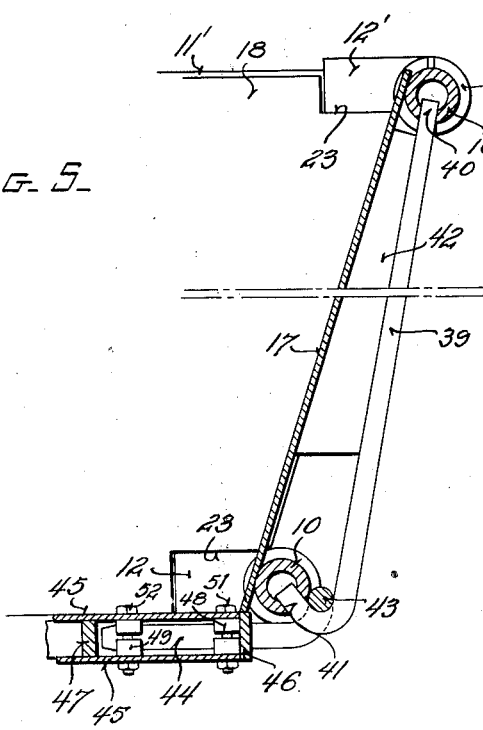
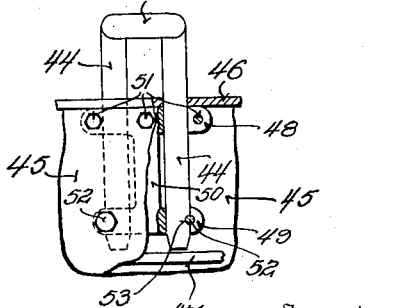
Inventor
GEORGE C. JETT
By Ralph W. Brown
Attorney Patented Mar. 26, 1935

1,995,854

UNITED STATES PATENT OFFICE 1,995,854

TRAILER

George C. Jett, Milwaukee, Wis., assignor of two-fifths to Walter H. Stiemke, Milwaukee, Wis.

Application March 19, 1930, Serial No. 436,964

13 Claims. (Cl. 298—35)

This invention relates to hauling units of the tractor-trailer type and particularly to trailers for use therewith.

An object of the present invention is the provision of an improved trailer of exceedingly light yet sturdy construction and of simple economical design. Sturdiness of construction is absolutely essential in trailers for the purpose mentioned, due to the severe usage to which they are subjected, and lightness of design is a requisite second only to that of sturdiness. Each of these essential characteristics has been attained without sacrificing or compromising the other in the trailer of the present invention, this being accomplished by a novel combination and arrangement of parts in which each part sustains to best advantage the stresses to which it is subjected. Economies of construction are attained by the use in the main of standard structural parts such as sheet steel plates, steel tubing, etc. which are securely united preferably by welding, the only other parts which go into the body comprising a few small castings of simple form which may be produced at small expense.

Another object is the provision of a bottom dump body for trailers possessing the above mentioned desirable characteristics.

Other objects and advantages will appear from the following description of an illustrative embodiment of the present invention.

In the accompanying drawings:—

Figure 1 is a view in side elevation of a trailer constructed in accordance with the present invention.

Fig. 2 is a top plan view thereof.

Fig. 3 is a bottom plan view.

Fig. 4 is a transverse sectional view taken substantially along the line 4—4 of Fig. 3.

Fig. 5 is a fragmentary sectional view along the line 5—5 of Fig. 1.

Fig. 6 is a detail of a door hanger shown in Fig. 5.

Fig. 7 is a fragmentary sectional view of the rear end of the body taken along the line 7—7 of Fig. 2.

Fig. 8 is a fragmentary interior view in elevation of an upper rear corner of the body.

Fig. 9 is a fragmentary sectional view of the front end of the body taken along the line 9—9 of Fig. 2.

Figs. 10 and 11 are transverse sectional views of the trailer tongue taken along the lines 10—10 and 11—11, respectively, of Fig. 1.

The trailer shown includes a substantially rectangular bottom frame formed of hollow steel tubing and comprising longitudinal tubes 10 and transverse tubes 11 rigidly connected through appropriate corner pieces 12. The corner pieces shown are in the form of goose-neck castings having socketed ends 13 for receiving the ends of the tubes to which they are rigidly secured preferably by arc-welding. The socketed ends 13 of the corner pieces are preferably slotted, as indicated at 14, to receive the welding stock which thus forms keys to more securely lock the tubes against twisting or turning. The trailer shown also includes a similarly formed top frame comprising a pair of longitudinal tubes 10' rigidly connected at the their rear ends to a transverse tube 11' through similarly formed corner pieces 12' into which they project and to which they are secured preferably by arc-welding. The forward ends of the longitudinal tubes 10' are in this instance rigidly connected to a pair of forwardly convergent tubes 15 which constitute parts of the trailer tongue to be later described. Tubes 10' and 15 are connected through castings 16 having socketed ends, similar to those of the corner pieces 12 for receiving the adjacent ends of the tubes and in which the tube ends are secured preferably by arc welding.

The top and bottom tubular frames are rigidly connected through plates preferably of sheet steel which constitute the sides and ends of the body. Each of the side plates 17 extends the full length of the body and bears along its upper and lower edges against the inner faces of the longitudinal tubes 10 and 10' to which they are secured preferably by welding. The rear end plate 18 is similarly applied and secured to the rear transverse tubes 11 and 11', and the front end plate 19 is similarly applied and secured along its lower edge to the forward transverse tube 11, but at its upper edge it is welded to the down turned edge 20 of a plate 21 (see Fig. 9) to be later described. The top body frame is preferably somewhat larger than the bottom frame to give a dished or hopper shape to the body, all four sides thereof being sloped inwardly toward the bottom frame. The four upright corner seams of the body are closed and reinforced by strips of steel angle sections 22, preferably externally applied and welded to the adjacent ends of the plates forming the body walls. The corners of each of the plates 17, 18 and 19 are cut away, as indicated at 23, in Figs. 7, 8, and 9 to accommodate the corner castings 12 and 12' and they are preferably welded to those castings for purposes of tightness as well as strength.

The opposite sides 17 of the body are rigidly connected by a hollow structure 24 comprising a pair of spaced steel plates whose upper margins 25 are bent inwardly toward each other and welded together into a rigid horizontal seam 26 extending across the body. The top of the structure 24 slopes in opposite directions from the central seam 26 so as to shed earth or other loose material therefrom. This structure is provided with end flanges 26' by which it is secured to the sides 17 of the body by riveting or otherwise. This structure serves a triple purpose, namely:—(1) to rigidify the sides 17 to thereby keep the body from spreading or caving; (2) to provide appropriate anchorage for the mounting brackets 27 by which the body is supported; and (3) to provide a housing for a suitable dump door operating mechanism, such as described in my copending application Serial No. 436,965, filed March 19, 1930. In this instance each of the mounting brackets 27 is in the form of a casting, having a flanged end face 28 for external application to a side plate 17, and a depending portion 29 in which one end of a horizontal spindle 30 is rigidly mounted. The end face 28 and depending portion 29 are connected by an integral upright web 31. The end face 28 of each bracket 27 is rigidly secured to a side plate 17 and end flanges 26' of the structure 24 preferably by the same rivets which secure the flanges 26 to the side plates 17. A pair of tie rods 32 extending through the brackets 27 and across the body at opposite sides of and adjacent the bottom of the structure 24, serve to reinforce the structure 24 and to securely hold the lower ends of the brackets 27 against spreading under the body load. A pair of steel tubes 33, securely fixed at their rear ends in lugs 34 formed on the brackets 27, extend forwardly and convergently through the front corners of the body, the forward ends of these tubes being combined with the tubes 15 to form the framework for the trailer tongue which will now be described.

As indicated in Fig. 1 the tongue of the trailer is of arched form to provide clearance for the tractor with which it is ordinarily used. In this instance the forward end of the tongue carries a casting 35 which constitutes a part of a trailer hitch, such as described in my copending application, Serial No. 268,119, filed April 7, 1928. The upper pair of tubes 15, which extend forwardly and convergently from the castings 16, curve downwardly toward and into the casting 35. The lower tubes 33, which extend forwardly, convergently, and upwardly from the lugs 34 in the brackets 27, are also downwardly curved adjacent their forward ends and enter the casting 35 adjacent the ends of tubes 15. The plate 21 whose rear downturned edge 20 is welded to the upper edge of plate 19, is welded along its side edges to the curved tubes 15 and extends downwardly along those tubes to the casting 35. Upright side plates 36 extend forwardly from the front end plate 19 of the trailer body to the casting 35 and are welded along their lower edges to the tubes 33, along their rear edges to the plate 19, along portions of their upper edges to the plate 21, and along the remaining portions of their upper edges to the tubes 15. Another plate 37, extending forwardly from the plate 19 to the casting 35 has its rear edge welded to the plate 19 and its side edges welded to the pair of tubes 33. The plates 21, 36, and 37, combined with the tubes 15 and 33 in the manner described form a tongue of box-like construction (see Figs. 10 and 11) and of great strength and rigidity.

It will be noted that the tubes 33 form direct connections between casting 35 and the mounting brackets 27 which support the trailer so that the draft load transmitted to the casting 35 from the tractor is transmitted directly to the supporting brackets independently of the trailer body. It will also be noted from inspection of Figs. 2 and 3 that the casting 35 constitutes the apex of a substantially triangular structure of which the tubes 33 form the sides and the cross structure 24 the base. This triangular structure affords great lateral rigidity and stability to the trailer, and the fact that the tubes 33 substantially coincide with the lines of stress between the casting 35 and mounting brackets 27 enhance the strength of the structure. In fact due to the angular relation of these tubes 33 with respect to the body they serve as truss members to effectively brace the body against weaving or warping and their use in this instance eliminates the necessity for the extremely heavy base frames heretofore required in open-bottom truck bodies previously designed. Due to their upward inclination they also serve as truss members to brace the body against twisting under the torque transmitted through the peculiarly shaped tongue under the peculiar reactions characteristic of the type of trailer hitch employed.

It will also be noted that the mounting brackets 27 are disposed somewhat rearwardly of the center of the trailer body, so that the body is unbalanced and a portion of the load thereof is supported by the tongue. The tubes 15 combined with the tubes 33 and plates 21, 36, and 37 in the manner described provide ample strength and rigidity to well sustain this unbalanced trailer load.

The bottom of the body is closed solely by a pair of doors 38 which in the elevated or closed position of Figs. 4 and 5, bear against the lower edges of the body plates 17, 18, and 19. Each door is hung from the outside of the body preferably in a manner now to be described. As illustrated particularly in Figs. 1, 3 and 5, a pair of upright tubes 39 are mounted externally of the body forwardly and rearwardly of the brackets 27. The upper end 40 of each tube 39 is securely anchored in one of the upper longitudinal tubes 10' and the lower end of each is bent upwardly, as at 41, and enters one of the lower longitudinal tubes 10 in which it is fixed preferably by welding. A plate 42 welded to and between each tube 39 and the adjacent side plate 17 of the body reinforces the tubes and body plates. The lower bent portions 41 of the tubes 39 constitute supports for appropriate door hangers 43 which in this instance are fashioned from steel rods bent into U form to provide legs 44 which straddle each supporting tube and which enter and are fixed in one of the doors. Each of the doors shown is formed of two spaced, parallel sheet steel plates 45 of rectangular form, bounded by a strip 46 of steel, and reinforced by a central longitudinal rib 47 of steel. The legs 44 of each hanger 43 project through the edge strip 46 of the door and are clamped between the split arms 48 and 49 of a clamp element 50, anchored within the door by bolts 51 and 52. (See Fig. 6). Bolts 52 engage in notches 53 formed in the legs 44 so as to securely lock the legs in place. The doors 38 are releasably retained in closed position by a pair of chains 54, which form a part of the door operating mechanism which is housed in the structure 24, the lower ends of the chains being secured to U-bolts 55 anchored in appropriate brackets 56 fixed to the doors adjacent the inner edges thereof, as fully described in my copending application first above mentioned.

As indicated in Fig. 1 the trailer body is rockably supported preferably on a pair of crawler tread mechanisms 57 of the type described in either of my copending applications Serial No. 240,141, filed December 15, 1927, or Serial No. 283,184, filed June 6, 1928. In this instance the frame 58 of each tread mechanism is rockably mounted intermediate its ends upon one of the spindles 30 carried by the brackets 27 of the trailer.

Various changes may be made in the embodiment of the invention hereinabove specifically described without departing from or sacrificing the advantages of the invention as defined in the appended claims.

I claim:—

1. In a trailer the combination of a substantially rectangular base frame, metal plates fixed to said frame and extending upwardly therefrom to form a body, an internal brace member connecting the side plates constituting the sides of said body intermediate the ends thereof, a pair of external brackets fixed to said side plates of said body adjacent the ends of said member, mobile supports mounted on said brackets, and a pair of forwardly converging members fixed to said brackets and extended forwardly of said body to form a tongue.

2. In a trailer the combination of a body having inwardly sloping side walls, a pair of mobile supports therefor, mounting means for said supports externally applied to said sloping side walls of said body, and a pair of forwardly converging members fixed to said mounting means and extended forwardly of said body to form a tongue.

3. In a trailer the combination of a hopper shaped body having inwardly sloping side walls, brackets externally applied to said side walls, mobile supports mounted on said brackets, forwardly converging members fixed to said brackets and extended forwardly beyond said body, said members being rigidly connected with the forward end of said body, and means securing the forward ends of said members together to form a tongue.

4. In a trailer the combination of a hopper shaped body having inwardly sloping side walls, a pair of mobile supports therefor, mounting means for said supports externally applied to said side walls, a pair of members fixed to said mounting means and extended forwardly beyond said body, a second pair of members fixed to the top of said body and extended forwardly therefrom, and means for rigidly uniting the forward ends of all of said members to form a tongue.

5. In a trailer the combination of a body, a pair of moblie supports at opposite sides of said body on which said body is rockably mounted, a pair of body bracing members fixed to the sides of said body and extended forwardly thereof, a second pair of members fixed to the sides of said body above said first named members and extended forwardly of said body, and a sheet metal structure rigidly uniting the forward portions of both pairs of members to form a rigid tongue.

6. In a trailer the combination of a body, a pair of mobile supports at opposite sides of said body on which said body is rockably mounted, a pair of members fixed to the sides of said body and extended forwardly thereof, the forward portion of said members being convergent and bent into arched form, a second pair of forwardly extended members fixed to the top of said body, the forward portions of said last named members being convergent and directed down toward said first named members, and means rigidly uniting both pairs of members to form an arched tongue.

7. In a trailer the combination of a base frame, a top frame, sheet metal plates connecting said frames to form a body, a pair of members extending from said top frame forwardly of said body, a second pair of members fixed to and extending from the sides of said body forwardly thereof, and a sheet metal structure rigidly uniting both pairs of members to form a tongue.

8. In a trailer the combination of tubular side members and tubular end members rigidly connected to form a substantially rectangular base frame, a similarly formed top frame, sheet metal plates connecting said frames to form a body, a brace member connecting the sides of said body intermediate the ends thereof, external brackets fixed to the sides of said body adjacent the ends of said brace member, a pair of tubular members fixed in said brackets and projecting forwardly beyond said body, a second pair of tubular members projecting forwardly from said top frame, and means for rigidly uniting both of said pairs of tubular members to form a rigid tongue.

9. In a trailer the combination of tubular side members and tubular end members rigidly connected to form a base frame, a similarly formed top frame, side plates and end plates connecting said frames to form a body a pair of upright brackets fixed to the opposite said plates of said body intermediate the ends thereof, a pair of mobile supports mounted on said brackets, and an internal brace member connecting the side plates of said body, said member being fixed to said side plates adjacent said brackets and extended vertically from the bottom of said body substantially to the tops of said brackets.

10. In a trailer the combination of a base frame, a top frame, upright sheet metal plates fixed to and within said frames to form a body having an open bottom, upright brace members spaced from said plates and connecting said top and base frames at each side of said body, a pair of doors for closing said bottom, and supports for each door supported by said upright members.

11. In a trailer the combination of a base frame, a top frame, upright sheet metal plates fixed to and within said frames to form a body having an open bottom, upright members spaced from said plates and connecting said top and base frames at each side of said body, a pair of doors for closing said bottom, U-shaped hangers for each door, each of said hangers being loosely supported by one of said upright members.

12. A trailer comprising a body having sheet metal side walls and an open bottom, doors for closing said bottom, a relatively deep sheet metal structure traversing said body and having its ends fixed to said side walls to brace the same, a pair of axle brackets each externally applied to one of said sheet metal side walls, and each having an attaching means substantially coextensive with and opposite an end of said sheet metal structure, and a transverse tie member connecting said brackets adjacent the bottom of said body.

13. A trailer comprising a hopper body having inwardly inclined sheet metal side walls and an open bottom, doors for closing said bottom, a relatively deep sheet metal structure traversing said body and having its ends fixed to said side walls to brace the same, a pair of axle brackets each externally applied to one of said sheet metal side walls, and each having an attaching means substantially coextensive with and opposite an end of said sheet metal structure, and a transverse tie member connecting said brackets adjacent the bottom of said body.

GEORGE C. JETT.